United States Patent [19]

Axmear et al.

[11] Patent Number: 4,488,189
[45] Date of Patent: Dec. 11, 1984

[54] SECTOR SERVO SEEK CONTROL

[75] Inventors: Frederick E. Axmear; Duane W. Baxter, both of Rochester, Minn.; John H. Saxman, Round Rock, Tex.; Michael M. Siverling, Rochester, Minn.

[73] Assignee: International Business Machines Corporation, Armonk, N.Y.

[21] Appl. No.: 414,285
[22] PCT Filed: May 17, 1982
[86] PCT No.: PCT/US82/00657
§ 371 Date: Aug. 16, 1982
§ 102(e) Date: Aug. 16, 1982
[87] PCT Pub. No.: WO83/04133
PCT Pub. Date: Nov. 24, 1983

[51] Int. Cl.³ .................. G11B 21/08; G11B 21/10; G05B 19/25
[52] U.S. Cl. .................. 360/78; 318/571; 360/77
[58] Field of Search .......... 360/77, 78, 79, 44, 360/48, 49, 135, 105, 107, 108, 75, 97, 98, 99; 318/571, 621, 628

[56] References Cited

U.S. PATENT DOCUMENTS

| 4,030,132 | 6/1977 | Iftikar | 360/78 |
|---|---|---|---|
| 4,103,314 | 7/1978 | Case | 360/78 |
| 4,217,612 | 8/1980 | Matla | 360/78 |
| 4,297,734 | 10/1981 | Laishley | 360/77 |
| 4,400,747 | 8/1983 | Siverling | 360/77 |

OTHER PUBLICATIONS

R. K. Oswald—"Head Positioning Servo Design for IBM 3344/3350 Disk Files", IEEE Transactions on Magnetics, vol. MAG-14, No. 4, pp. 176-177, publ. Jul. 1978.

B. McKnight—"A Track Locating Servo System Utilizing the Data Heads as Absolute Position Transducers", IEEE Transactions on Magnetics, vol. MAG-14, No. 4, pp. 182-184, publ. Jul. 1978.

Primary Examiner—Robert M. Kilgore
Attorney, Agent, or Firm—Robert W. Lahtinen

[57] ABSTRACT

A sector servo seek control samples each sector to obtain sector time, the track identification within a sequence of track types and a position error signal for a track location to track location seek. The device during each sector determines the actual transducer track location and the next sector projected track location with respect to the sequence of track types. The projected track location is corrected using the error signal to find the actual location, but if a sector signal is missing or erroneous, the projected location is used as the actual location, permitting a composite correction to be made when a correct sector signal is obtained. The seek time is minimized by using maximum acceleration followed by maximum deceleration while not exceeding a velocity value that would cause the device to overshoot the target track using full deceleration.

11 Claims, 9 Drawing Figures

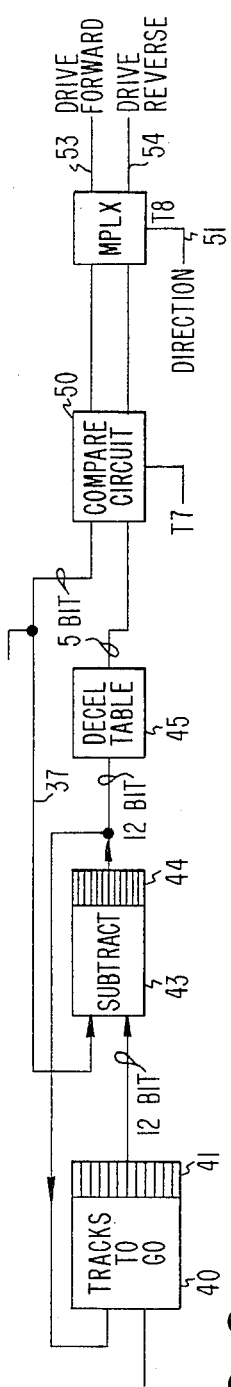
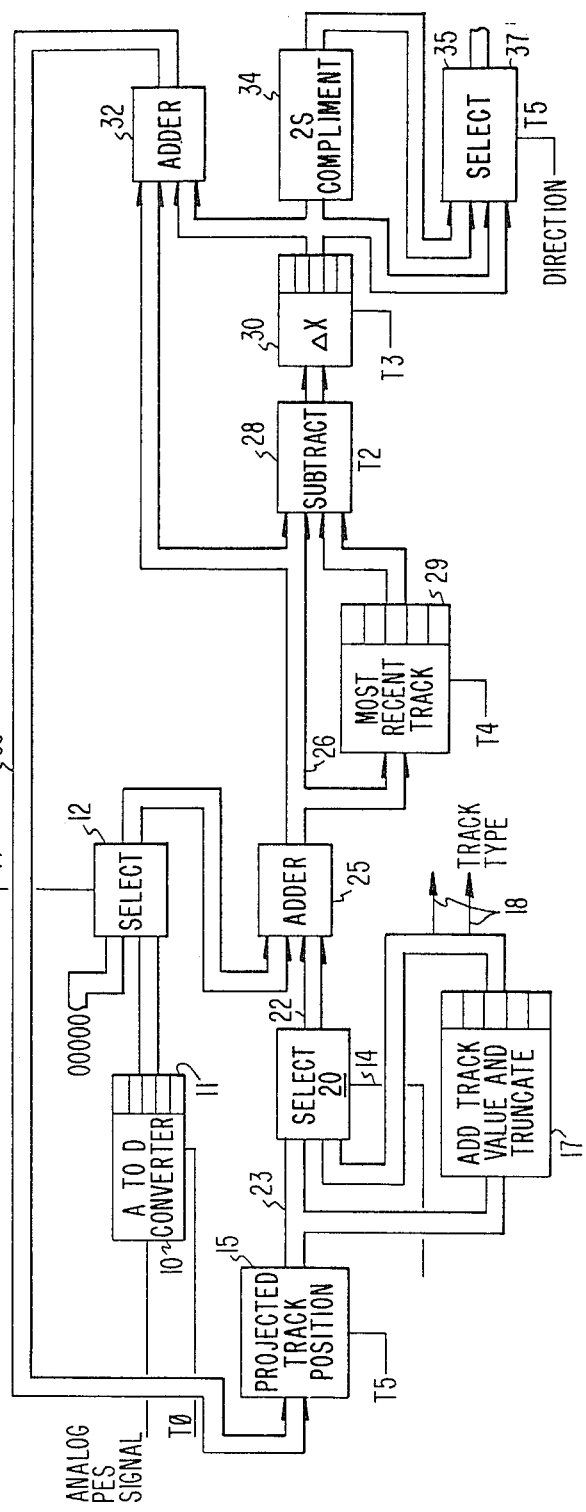
FIG. 2
FIG. 1

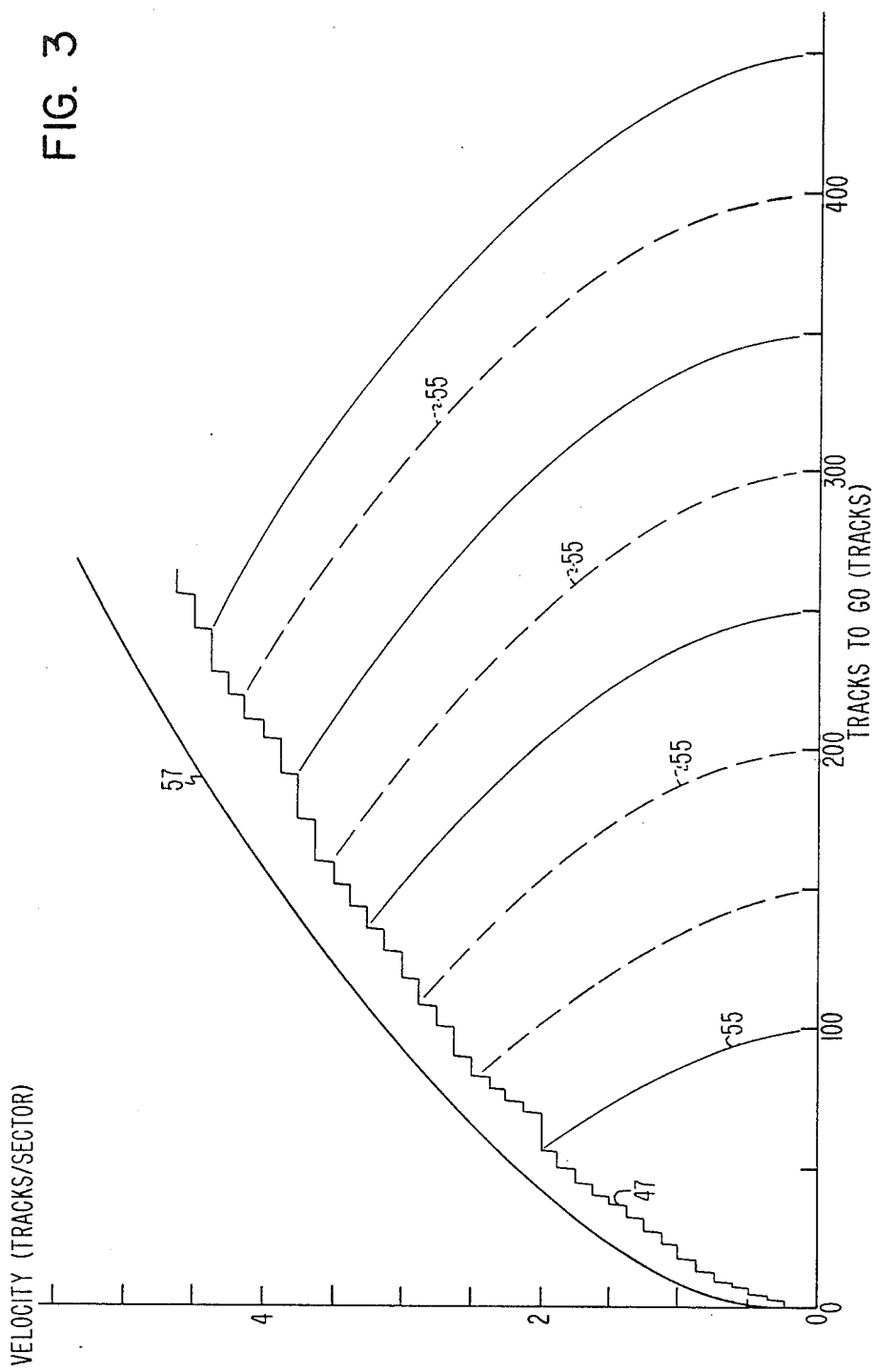

SECTOR SERVO SEEK CONTROL

DESCRIPTION

1. Technical Field

This invention relates to data storage devices using sector servo wherein data and servo information are arranged in parallel tracks composed of sectors and more particularly to a seek control system for moving the transducer assembly from one track location to another track location.

2. Background Art

Sector servo for rotating data storage devices is well known, but not widely used. The four track wide capture area and three track linear capture area of U.S. patent application, Ser. No. 277,764 filed June 26, 1981, now U.S. Pat. No. 4,400,747, is used to implement the technique of the present invention. Prior sector servo systems have utilized control techniques that cause the last generated servo information to simulate the position error signal that would be obtained from a dedicated servo surface. The use of continuous simulated servo information has the disadvantage of requiring the extra steps of generating the signal. These steps also add to the complexity and cost of the circuits required and probably decrease reliability.

DISCLOSURE OF INVENTION

In accordance with the present invention, a seek operation control effectively controls input to the drive coil during access, which applies drive to the transducer assembly and also projects where the transducer will be when the next sector information is received.

The method and apparatus of the invention samples the servodata of each servo sector to provide samples which occur more than 3,000 times per second. During each servo time of a seek operation, the transducer travel between the two immediately preceding servo signals is used to generate a projected position for the next sample time which is truncated to indicate one of four track types. At the next sector time sample, the error signal is added to the truncated value to produce the current actual position from which the velocity and sector time transducer travel is derived and the next position generated. The sector travel is subtracted from the "tracks to go" register value to maintain a continuous record of transducer position and the number of tracks yet to be crossed during the seek operation. The system is tolerant of missing sectors by supressing the error signal and truncated position while using in place thereof, the projected position. Thus an error condition can be tolerated for several sector times before any possibility exists that the next sector signal will not restore the correct current actual position.

BRIEF DESCRIPTION OF THE DRAWINGS

The details of the invention will be described in conjunction with the accompanying drawings in which FIG. 1 is a block diagram showing the projection of sector time position and correction to achieve the actual present location using the position error signal;

FIG. 2 is a block diagram showing the recording of remaining tracks during the seek operation and drive control;

FIG. 3 is a graphic representation of acceleration and deceleration values;

BEST MODE FOR CARRYING OUT THE INVENTION

Figure 4A:
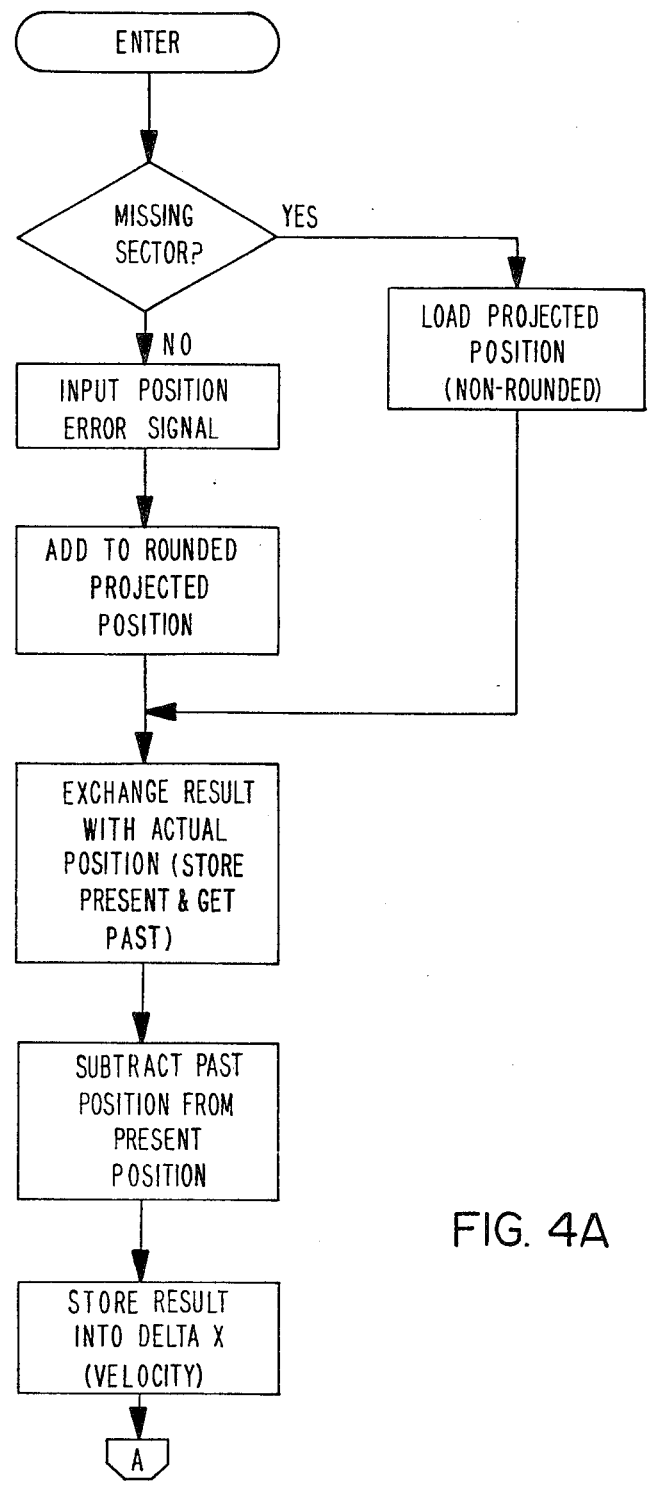
FIGS. 4A through 4E comprise a flow chart showing the steps of the seek control technique.
Figure 4B:
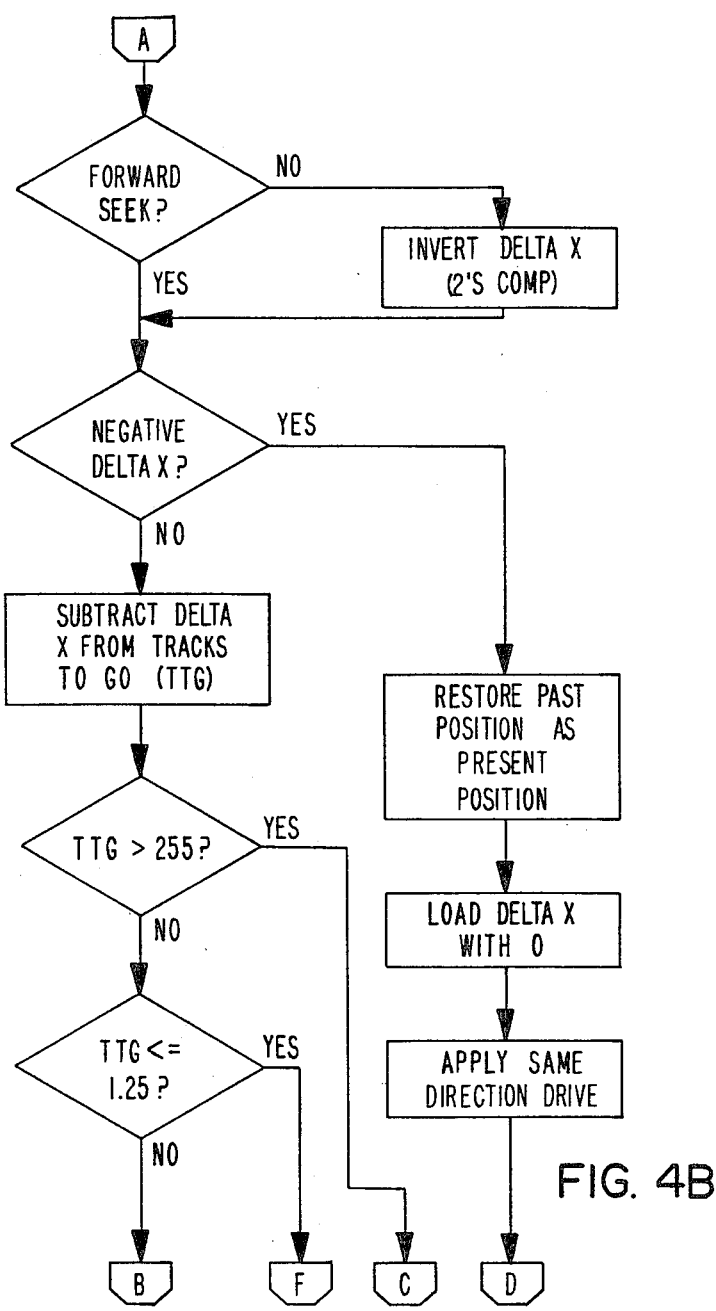
Figure 4C:
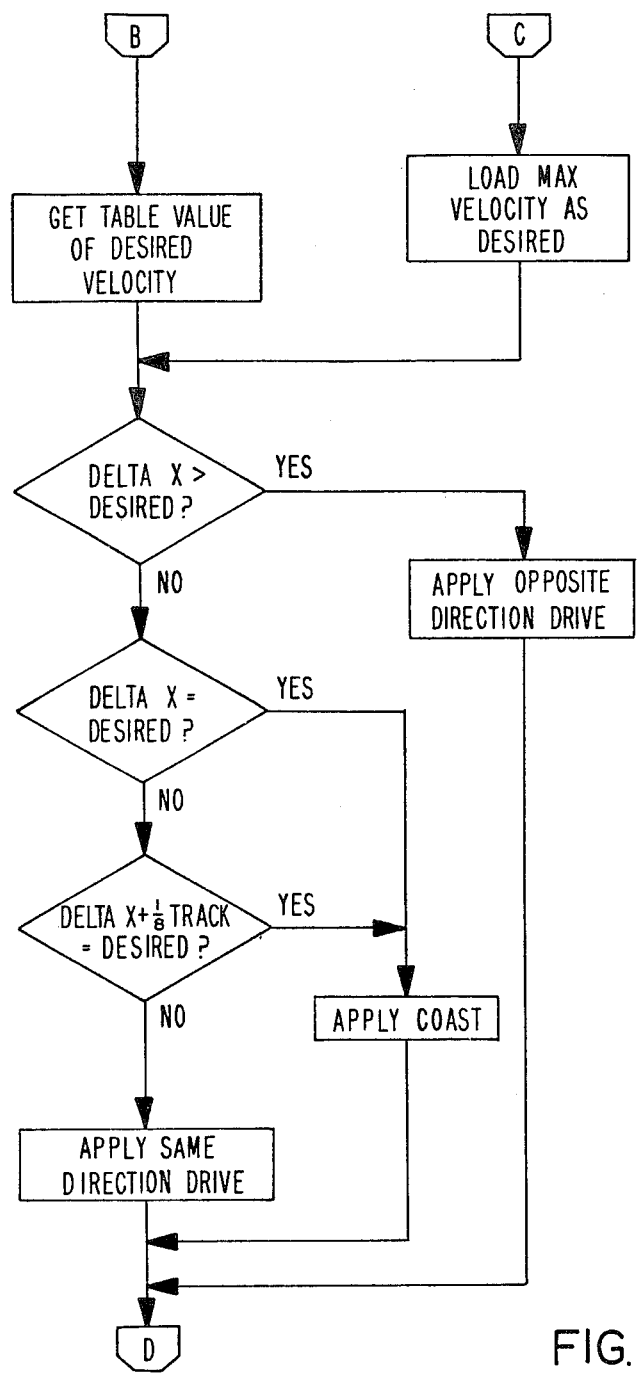
Figure 4D:
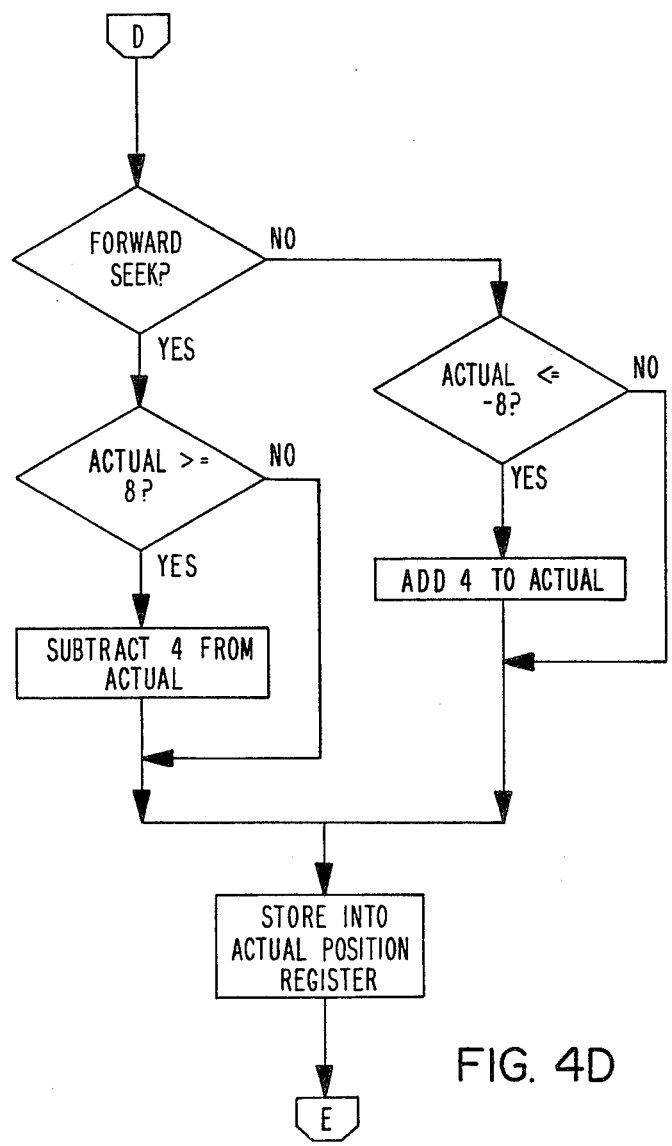
Figure 4E:
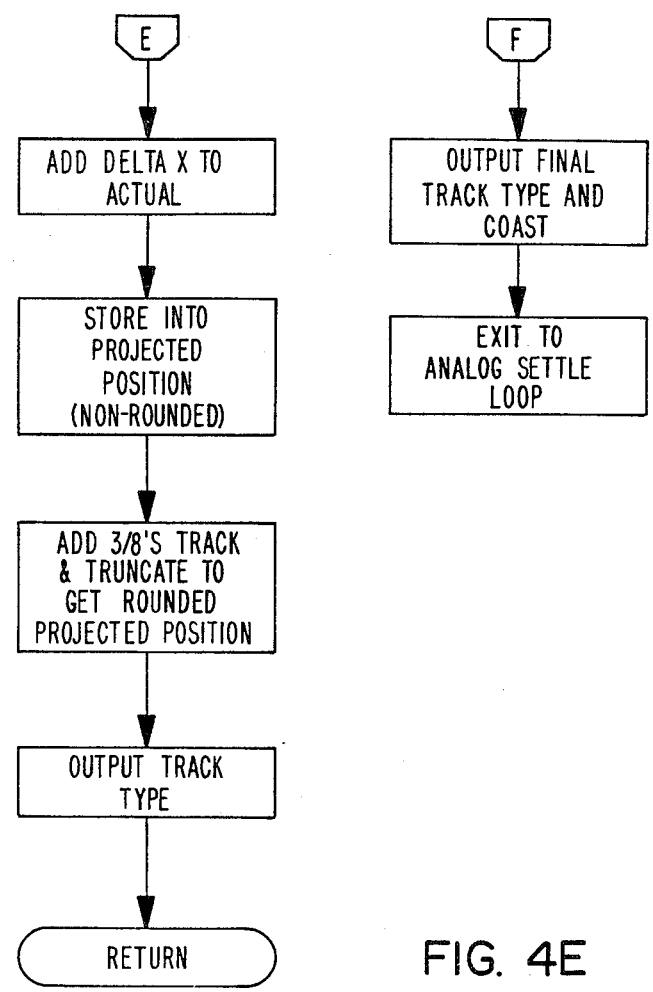

Referring to FIG. 1, an analog position error signal is communicated to the analog to digital converter 10 where at time T0 the value is latched in a five bit register 11. The output register 11 of A/D converter 10 is received as an input of the select circuit 12 and normally becomes the circuit output. If however a signal appears on missing sector line 14, indicating that a sector has been missed, the output of selection circuit becomes 5 zero bits to prevent an error correction.

During the previous cycle the last sector projected position was latched in register 15 at T5 time. The last sector projected position is truncated and rounded to a whole number indicative of the track type by circuit 17 and latched in the output register. The two lines 18 from the output make the track type available to the system. Select circuit 20 normally selects the rounded-off track type output of circuit 17 as the output on bus 22; however, when missing sector line 14 is active indicating the absence of a sector signal, the select circuit selects the last sector projected position from bus 23. The output of selection circuits 12 and 20 are totaled by adder 25 at T] time to produce the actual position signal in bus 26 which is normally the rounded off projected position plus the error signal value to provide the correct current position as a five bit output wherein the most significant two bits indicate the track type and the remaining 3 bits show the deviation in one-eighth track increments. When a missing sector is indicated, the adder output on bus 26 is the unmodified last sector projected position from the latched output of register 15.

At T2 time the difference circuit 28 subtracts the actual position of the last cycle stored in register 29 from the current actual position on bus 26. At T3 time the delta X value representative of the velocity during the sector is latched in register 30. Adder 32 at T4 time adds the actual position and the velocity (which for a sector is the distance traveled during a sector time) to yield the projected location on bus 33. Also at T4 time 2's compliment circuit 34 yields a negative input to selector 35. At T5 time the direction signal selects the absolute velocity value for output on bus 37, and the value on bus 33 is loaded into the output register of circuit 15.

In FIG. 2, the number of tracks to be traversed is loaded by the circuit 40 into the 12 bit output register 41. During each sector cycle during the seek, the distance value or delta X value on bus 37 is subtracted from the current value in register 41 by circuit 43 and the remainder latched into register 44 at T6 time such that register 41 contains the current value of the tracks remaining during the seek. The output of register 44 also accesses the deceleration table 45 which reflects the values of the deceleration curve 47 of FIG. 3 to produce a desired velocity per sector on bus 48. At T7 time compare circuit 50 determines whether the actual velocity or desired velocity is greater and with the direction signal on line 51 outputs signals on lines 53 and 54 at T8 times to indicate forward drive or reverse drive. If both forward and reverse drive lines are at the same level, the actuator carriage is allowed to coast for one sector. The times indicated throughout FIGS. 1 and 2, T0 through T8 are consecutive.

FIG. 3 shows the curves that are indicative of the acceleration and deceleration values attained during a multi-track seek by the transducer head supporting carriage. The "tracks to go" on the X axis show the number of tracks to be traversed during the seek. The family of curves 55 extending from the X axis show maximum acceleration curves from selected lengths of a track seek representative of an acceleration generated by applying forward drive during each sector time until a desired velocity is approached. As long as the seek sequence is following an acceleration curve until within ⅛ track per sector velocity of the established velocity deceleration curve 47, full forward drive power is supplied during each successive sector. When on curve 47 or within ⅛ track per sector below curve 47, no drive power is applied and when the velocity exceeds curve 47 full deceleration power is applied during the next sector. The maximum deceleration curve 57 is the velocity value that must not be exceeded if an overshot of the target track is to be avoided.

During each sector time of the multi-line seek the following events occur. The last sector actual position has the velocity per sector added thereto to establish a next sector projected position to which a ⅜ track value is added and the total truncated to a rounded-off whole number track type. The track value is a 5 bit digital number wherein the two most significant digits indicate one of the four track types and the 3 least significant digits are the digital deviation from the track centerline in eights of a track; thus 01011 represents track type 1 displaced ⅜ track toward the adjoining track type 2. The position error signal is then added to the whole number track type above with the sum indicative of the actual position of the transducer head within the 4 track bracket. Since the maximum acceleration during a sector is about 0.05 tracks per sector, it is unlikely that the calculated position will fall outside the 4 track type group of tracks either through error or as a result of several sequentially missing sector signals. When a missing sector signal is received, the projected sector position modifying circuits are disabled, and the projected sector position is gated instead during the sector. Further the position error signal is disabled and a zero correction gated. Accordingly, the projected position is used and modified by the last accurate velocity value during each sector where a missing sector signal is indicated. By following this procedure the transducer position is determined, and the "tracks to go" register count is updated approximately 4,000 times per second.

The technique may be practiced using hardware logic circuits when high speed is required or in conjunction with a controller or processor when slower speed execution of the steps can be tolerated. The flow chart of FIG. 4 also illustrates the sequence of data handling which occurs during each sector time of a seek operation after initialization. Upon entering the sequence the occurrence of a missing sector is determined. If no sector identifying signal is received during a predetermined time, it is determined that a sector has been missed, and the unmodified projected sector position is used and not corrected pending receipt of an accurate sector signal during a subsequent sector time when the then sensed error signal will make a composite correction for deviations occurring during the plurality of sectors since the last correct sector time.

If the sector signal is correctly sensed, the normal procedure follows wherein the sensed position error signal (PES) is gated and added to the rounded projected position. When the actual position is determined by adding the error signal to the rounded projected position, the position from the previous sector is subtracted from the present actual position to give a delta X or velocity value. Since delta X is the velocity per sector for a one sector period, the value also is the distance in tracks that the transducer assembly moved since the last sector time or sector signal sample time.

If a forward seek is occurring in the direction of ascending track type numbers, no action is required. If the seek is in the opposite direction, delta X is inverted using 2's compliment arithmetic. If delta X is sensed to be a negative value, it is regarded as an error condition and the system ignores the value causing the past position to be restored as the present position. The delta X is loaded with a zero value, and the same direction drive is applied. If no error condition is identified by a negative delta X value, the delta X value is subtracted from the "tracks to go" (TTG) register.

The system next determines whether and in which direction drive is to be applied to move the transducer assembly during the next one sector duration drive period. If the number of remaining tracks to be crossed during the seek is greater than 255, the maximum velocity is loaded as the desired velocity. If the number of tracks to go is 1.25 or less, the final track type is placed on the track type output, the settling sequence is invoked, and control is turned over to the track follow system to center the transducer over the track centerline. If the number of tracks remaining neither exceeds 25 nor is 1.25 or less, a table value for the desired transducer assembly velocity for the current "tracks to go" position is obtained. If the velocity (delta X) is greater than the desired velocity, opposite direction drive or a decelerating force is applied. If the velocity is equal to or within ⅛ track per second less than the desired velocity, the transducer assembly is allowed to coast for one sector time, and if the velocity is more than one-eighth track per sector slower than the desired velocity, a same direction or accelerating drive is applied.

By establishing a dead band in the region between the desired velocity as an eighth track per sector less, it is possible to allow the transducer assembly to coast a large portion of the time during deceleration. Although ⅛ track per sector appears small, it is about three times the acceleration or deceleration that is effected by a one sector pulse. This reduces the need to pulse the motor in alternate directions on a frequent basis in maintaining the desired velocity profile.

The track types in the present embodiment are four in number, and the track position of the transducer assembly is identified by 5 bits. The least significant three bits indicate the deviation from the track type in eighths of a track pitch. The next two more significant bits indicate the track type. The last three or most significant bit positions of the 8 bit byte contain the carry from the track type. In processing from one four track group to another the number in the three most significant bit positions is either incremented or decremented. In a forward seek condition if a value of 8 or more appears in the overflow from the track type count, a count of 4 is subtracted. Similarly, if a count of −8 or less appears in the overflow from the track type count, a value of 4 is added. This prevents the five bit portion of the register that identifies track position from becoming inaccurate as the transducer moves from one track group to another.

Finally delta X or sector time travel is added to the actual value and stored in the projected position register. The projected position is rounded off by adding ⅜ track and truncating to the track type value preparatory to receipt of the next sector sense signal whereupon the sequence beginning at FIG. 4A is repeated. This sequence occurs more than 3,000 times per second as the successive sectors appear.

Figure 5:
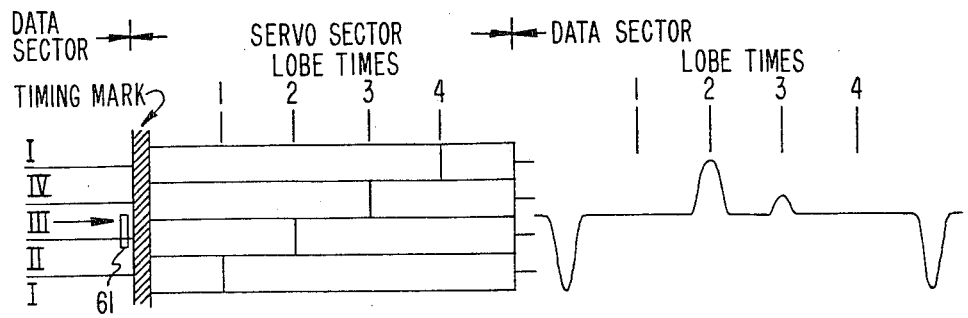
FIG. 5 shows a sector servo technique for identifying one of four adjacent tracks while generating a position error signal representative of the deviation from the track centerline.

FIG. 5 shows the sector servo format that identifies one of four track types and at the same time yields an analog position error signal indicative of the displacement of the transducer from the centerline of the identified data track type. As shown the data tracks are of types I, II, III and IV with the centerline of the data track defined by the interface between two servo tracks. When the transducer gap 61 moves in the direction of the arrow, the timing mark indicates the presence of a sector and is followed by the servo information. Transducer gap 61 is on a track type III, but is displaced from the centerline toward the adjoining type II track. During passage over the servo sector the transducer will read the analog signals at lobe times 2 and 3 as shown in the curve at the right side of FIG. 5. Equal amplitude pulses at lobe times 2 and 3 would indicate the transducer to be positioned on the centerline of a type III track. The analog difference in lobe amplitude is the position error signal indicative of the amount and direction of deviation from the data track centerline. A signal at each of lobe times 1 and 4 indicates a type I track, a signals at lobe times 1 and 2 indicates a type II track and signals at lobe times 3 and 4 indicates a type IV track. A single large amplitude lobe time signal is indicative of a transducer position midway between data track centerlines.

We claim:

1. In a data storage device wherein information is retained on tracks in sectors containing servo data that define sequences of track types that form a capture area and that are accessed by a transducer assembly driven by an electromagnetic actuator, position control means for moving said transducer assembly from one track location to another track location comprising:
   first means to ascertain and record transducer assembly track position at the current sector time;
   second means for determining the projected track position of said transducer assembly at the next sector time;
   third means for truncating said projected track position; and
   fourth means for sensing an error signal and adding said error signal to said truncated projected track position to generate said next sector time actual track position.

2. The data storage device position control means of claim 1 wherein said fourth means includes an analog signal indicative of the nearest track type with an analog value indicative of the partial track pitch deviation of said transducer assembly from the centerline of such nearest track.

3. The data storage device position control means of claim 2 wherein the analog signal of said fourth means is digitized to indicate the deviation of said transducer head assembly from said track type in incremental units of track pitch.

4. The data storage device position control means of claim 1 wherein the projected track position of said second means is determined by adding to the present actual track position, the track position change of said transducer assembly during the next previous sector time.

5. The data storage device position control means of claim 4 further comprising fifth means effective when a sector time signal fails to occur for disabling said second and third means and substituting the sector projected value for said next sector time actual track position, whereby when a sector signal is missing the track position is not corrected by application of an error signal until a sector time is correctly sensed.

6. In a data storage device wherein information is retained on tracks in sectors containing servo data that define sequences of track types that form a capture area and that are accessed by a transducer assembly driven by an electromagnetic actuator, position control means for moving said transducer assembly from one track location to another track location comprising:
   means for sensing and recording the actual track position of said transducer assembly relative to said sequence of track types at a first sample time;
   means for sensing and recording the actual track position of said transducer assembly at a second sample time next subsequent to said first sample time; and
   means for projecting the position of said transducer assembly at a third sample time next subsequent to said second sample time by adding the distance said transducer assembly traveled between said first and second sample times and said second sample time actual track position.

7. The data storage device position control means of claim 6 further comprising:
   means for determining the position of said transducer assembly with respect to said sequence of track types and the velocity of said transducer assembly during each sector time;
   means for determining and recording the number of tracks remaining during the seek operation sequence;
   means for comparing the present velocity with predetermined velocity values for the number of tracks remaining during the seek sequence; and
   means responsive to the output of said means for comparing to determine the magnitude and direction of the drive to be applied to said transducer assembly.

8. In a data storage device wherein information is retained on tracks in sectors containing servo data that define sequences of track types that form a capture area and that are accessed by a transducer assembly driven by an electromagnetic actuator, position control means for moving said transducer assembly from one track location to another track location comprising:
   means to ascertain and record the current track position of said transducer assembly at the current sector time;
   means to project the track position of said transducer assembly at the next sector time based on the present and next previous track positions; and
   means for determining the actual track position of said transducer assembly at said next sector time.

9. In a storage device where data is retained on parallel tracks in sectors including servo sector portions and data sector portions with said tracks having recurring sequences of track types that define a plural track, capture area and generate a position error signal when accessed by a transducer, a method of track location to track location seek control comprising during each sector time determining the present sector actual track location as a function of said sequence of track types, and generating a next sector projected track location as a function of said sequence of track types.

10. The method of claim 9 wherein the step of determining the present sector actual track location comprises truncating the projected track location, generated during the previous sector time and adding the position error signal thereto; and said next sector projected track location is generated by adding the track displacement occurring during the previous sector time to the present sector actual track location.

11. The method of claim 10 which upon receipt of a missing sector signal comprises the further steps of suppressing said position error signal and said truncated projected track location and using the projected track location as the actual track location.

* * * * *